(12) United States Patent
He et al.

(10) Patent No.: US 9,727,214 B2
(45) Date of Patent: Aug. 8, 2017

(54) ELECTRONIC APPARATUS AND OBJECT PROCESSING METHOD THEREOF

(75) Inventors: Zhiqiang He, Beijing (CN); Haisheng Xu, Beijing (CN); Rong Yang, Beijing (CN); Ming Cai, Beijing (CN); Haixin Chai, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 197 days.

(21) Appl. No.: 13/976,654

(22) PCT Filed: Dec. 30, 2011

(86) PCT No.: PCT/CN2011/085013
§ 371 (c)(1),
(2), (4) Date: Jun. 27, 2013

(87) PCT Pub. No.: WO2012/089157
PCT Pub. Date: Jul. 5, 2012

(65) Prior Publication Data
US 2013/0275912 A1    Oct. 17, 2013

(30) Foreign Application Priority Data

Dec. 31, 2010 (CN) .......................... 2010 1 0624333
Dec. 31, 2010 (CN) .......................... 2010 1 0624334

(51) Int. Cl.
*G06F 3/0484* (2013.01)
*G06F 3/048* (2013.01)
(Continued)

(52) U.S. Cl.
CPC ............ *G06F 3/0484* (2013.01); *G06F 3/048* (2013.01); *G06F 8/38* (2013.01); *H04M 1/72522* (2013.01); *H04M 1/72583* (2013.01)

(58) Field of Classification Search
USPC ....... 715/249, 764, 769, 775, 779, 781, 782, 715/786, 801, 810, 835, 850
See application file for complete search history.

(56) References Cited

U.S. PATENT DOCUMENTS 6,501,487 B1 * 12/2002 Taguchi ............... G06F 3/0481
715/788
7,512,884 B2 * 3/2009 Gupta .................. G06F 9/4443
715/716

(Continued)

FOREIGN PATENT DOCUMENTS

CN      1538273 A      10/2004
CN    101036104 A       9/2007

(Continued)

OTHER PUBLICATIONS

International Search Report dated Mar. 22, 2012 issued in PCT/CN2011/085013.

*Primary Examiner* — Doon Chow
*Assistant Examiner* — Wendy Nicholas
(74) *Attorney, Agent, or Firm* — Scully Scott Murphy & Presser

(57) ABSTRACT

An electronic apparatus and an object processing method are provided. An interface management module of the apparatus generates a user operation interface on the display screen. The interface has a first operating area and a second operating area, which have their respective sizes associated with each other in the interface. A first functional module displays a first object in the first operating area. A second functional module displays a second object in the second operating area. A first application program unit performs a corresponding process operation on the first object. An acquisition unit acquires a first operation by a user on the first operating area.

(Continued)

A control unit controls the first application program unit to be in a ready state, when the first operation satisfies a predetermined condition.

8 Claims, 9 Drawing Sheets

(51) Int. Cl.
*G06F 9/44* (2006.01)
*H04M 1/725* (2006.01)

(56) References Cited

U.S. PATENT DOCUMENTS

| | | | |
|---|---|---|---|
| 8,745,505 B2* | 6/2014 | Tam | 715/738 |
| 2006/0101053 A1* | 5/2006 | Proctor | 707/102 |
| 2006/0190833 A1* | 8/2006 | SanGiovanni | G06F 3/04883 715/767 |
| 2006/0218502 A1* | 9/2006 | Matthews | G06F 3/0482 715/779 |
| 2007/0229517 A1* | 10/2007 | May | G06Q 10/109 345/501 |
| 2008/0282158 A1* | 11/2008 | Aaltonen | G06F 3/0482 715/700 |
| 2009/0013282 A1* | 1/2009 | Mercer | G06F 3/0481 715/788 |
| 2009/0199128 A1* | 8/2009 | Matthews | G06F 3/0481 715/799 |
| 2009/0228820 A1 | 9/2009 | Kim et al. | |
| 2010/0088634 A1* | 4/2010 | Tsuruta | G06F 3/0488 715/800 |
| 2010/0117973 A1* | 5/2010 | Chiang | G06F 3/0482 345/173 |
| 2010/0138767 A1* | 6/2010 | Wang | G06F 3/0481 715/769 |
| 2010/0248788 A1* | 9/2010 | Yook | G06F 3/0481 455/566 |
| 2011/0196812 A1* | 8/2011 | Jezek, Jr. | G06F 3/048 705/36 R |
| 2011/0279388 A1* | 11/2011 | Jung | G06F 3/04883 345/173 |

FOREIGN PATENT DOCUMENTS

| | | |
|---|---|---|
| CN | 101359271 A | 2/2009 |
| CN | 101527745 A | 9/2009 |
| CN | 101770332 A | 7/2010 |
| CN | 101833416 A | 9/2010 |
| JP | 2007-280227 A | 10/2007 |

* cited by examiner

ELECTRONIC APPARATUS AND OBJECT PROCESSING METHOD THEREOF

TECHNICAL FIELD

The present disclosure generally relates to management of object(s) in electronic apparatuses, and more particularly, to an electronic apparatus and an object processing method thereof.

BACKGROUND

In existing electronic apparatuses, there are more and more objects (e.g., files, file folders, and the like) to be managed. For example, if it is desired to open an object, it is necessary that a user selects and then double-clicks this object, in order to open this object. Further, if several objects are opened in different windows, the user has to switch among these windows. Such management is very inconvenient.

SUMMARY

According to aspects of the present disclosure, there are provided electronic apparatuses and object processing methods, by which it is possible for a user to manage objects in the electronic apparatuses in a convenient way.

According to an embodiment of the present disclosure, there is provided an electronic apparatus, comprising: a display screen; an interface management module configured to generate a user operation interface on the display screen, the user operation interface including a first operating area and a second operating area, wherein the first operating area and the second operating area have their respective sizes associated with each other in the user operation interface; a first functional module configured to display a first object in the first operating area; a second functional module configured to display a second object in the second operating area; a first application program unit configured to perform a corresponding process operation on the first object; an acquisition unit configured to acquire a first operation by a user on the first operating area; and a control unit configured to control the first application program unit to be in a ready state when the first operation satisfies a predetermined condition.

According to an example, the first application program unit may be configured to perform the corresponding process operation on the first object after it is controlled to be in the ready state.

According to an example, the interface management module may be configured to provide a control module on the user operation interface. In this case, the control unit may be configured to determine that the first operation satisfies the predetermined condition if the control module is drawn to a first region of the display screen, and to control the first application program unit to be in the ready state and exclusively occupy the display screen, wherein a distance from any point in the first region to a vertex of the display screen is smaller than a predetermined value. Further, the interface management module may be further configured to control the sizes of the first and second operating areas based on a current position of the control module during the drawing of the control module to the first region. The interface management module may be further configured to adjust the objects displayed in the first and second operating areas in terms of number and/or display size based on changing of the sizes of the first and second operating areas.

According to an example, the electronic apparatus may further comprise: a system unit configured to provide a first service and a second service, wherein the first functional module is further configured to perform a first processing on the first object in the first operating area based on the first service, wherein the second functional module is further configured to perform a second processing on the second object in the second operating area based on the second service, and wherein the first application program unit is configured to perform the corresponding process operation on the first object based on the first service. Further, the first application program unit may be configured to perform the corresponding process operation on the first object from a first position of the first object based on the first service after it is controlled to be in the ready state, wherein the first position is a position by which the first object has been processed by the first functional module before the first application program unit is controlled to be in the ready state.

According to a further embodiment of the present disclosure, there is provided an object processing method in an electronic apparatus, the electronic apparatus comprising a display screen, the object processing method comprising: generating a user operation interface on the display screen, the user operation interface including a first operating area and a second operating area, wherein the first operating area and the second operating area have their respective sizes associated with each other in the user operation interface; displaying a first object in the first operating area; displaying a second object in the second operating area; acquiring a first operation by a user on the first operating area; and controlling a first application program unit, which is capable of performing a corresponding process operation on the first object, to be in a ready state when the first operation satisfies a predetermined condition.

According to an example, the method may further comprise: performing the corresponding process operation on the first object by the first application program unit after it is controlled to be in the ready state.

According to an example, the method may further comprise: providing a control module on the user operation interface; and determining that the first operation satisfies the predetermined condition if the control module is drawn to a first region of the display screen, and controlling the first application program unit to be in the ready state and exclusively occupy the display screen, wherein a distance from any point in the first region to a vertex of the display screen is smaller than a predetermined value. Further, the method may further comprise: controlling the sizes of the first and second operating areas based on a current position of the control module during the drawing of the control module to the first region. In this case, the method may further comprise: adjusting the objects displayed in the first and second operating areas in terms of number and/or display size based on changing of the sizes of the first and second operating areas.

According to an example, the method may further comprise: performing a first processing on the first object in the first operating area based on a first service provided by a system unit; and performing a second processing on the second object in the second operating area based on a second service provided by the system unit, wherein the first application program unit is configured to perform the corresponding process operation on the first object based on the first service. Further, the method may further comprise: performing the corresponding process operation on the first object from a first position of the first object based on the first service by the first application program unit after it is controlled to be in the ready state, wherein the first position is a position by which the first object has been processed before the first application program unit is controlled to be in the ready state.

According to a further embodiment of the present disclosure, there is provided an electronic apparatus, comprising: a display screen; an interface management module configured to generate a user operation interface on the display screen, wherein the user operation interface includes at least two operating areas having their respective sizes associated with each other, and wherein a first operating area of the at least two operating areas includes at least a first object therein; a first operation acquisition unit configured to acquire a first operation; an object-determination-information acquisition unit configured to acquire object determination information based on the first operation; an object determination unit configured to determine a second object based on the object determination information; and an object alternation unit configured to alter the first object displayed in the first operating area to the second object based on the first operation.

According to a further embodiment of the present disclosure, there is provided an object processing method for an electronic apparatus, the electronic apparatus comprising a display screen having a user operation interface displayed thereon, wherein the user operation interface includes at least two operating areas having their respective sizes associated with each other and a first operating area of the at least two operating areas includes at least a first object therein, the object processing method comprising: acquiring a first operation; acquiring object determination information based on the first operation; determining a second object based on the object determination information; and altering the first object displayed in the first operating area to the second object based on the first operation.

According to an example, the object determination information may comprise storage location information, object attribute information, and/or application program unit information. If the object determination information comprises the storage location information, the method may comprise determining an object stored at a storage location indicated by the storage location information as the second object. If the object determination information comprises the object attribute information, the method may comprise determining an object having an attribute the same as that indicated by the object attribute information as the second object. If the object determination information comprises the application program unit information, the method may comprise determining an object which is capable of being processed by an application program unit indicated by the application program unit information as the second object.

According to an example, the user operation interface may be provided with a first control module, wherein the first control module includes a plurality of sub-modules, and each of the sub-modules corresponds to a piece of object determination information and has an indicator displayed thereon. In this case, acquiring the object determination information based on the first operation may comprise: determining a first one of the sub-modules based on the first operation; and acquiring the object determination information corresponding to the first sub-module. Further, after altering the first object displayed in the first operating area to the second object based on the first operation, the object processing method may further comprise: modifying the indicator displayed on the first sub-module, and setting object determination information associated with the first object as the object determination information corresponding to the first sub-module; or alternatively adding a second sub-module to the first control module, and setting the object determination information associated with the first object as the object determination information corresponding to the second sub-module.

According to an example, the method may further comprise: acquiring a first associated application program unit based on the first operation, wherein the first associated application program unit is one capable of processing the second object based on a first associated service provided by the system; and setting the first associated application program unit as an associated application program unit corresponding to the first operating area.

According to an example, the user operation interface may be provided with a first control module, wherein the first control module includes a plurality of sub-modules, and each of the sub-modules has an indicator displayed thereon and has a piece of object determination information and an associated application program corresponding thereto. In this case, acquiring the object determination information based on the first operation may comprise: determining a first one of the sub-modules based on the first operation; and acquiring the object determination information corresponding to the first sub-module. Further, acquiring the first associated application program unit based on the first operation may comprise: determining a first one of the sub-modules based on the first operation; and acquiring the associated application program corresponding to the first sub-module. Further, after altering the first object displayed in the first operating area to the second object based on the first operation, the object processing method may further comprise: modifying the indicator displayed on the first sub-module, and setting object determination information associated with the first object and an associated application program unit capable of processing the first object as the object determination information and the associated application program corresponding to the first sub-module, respectively; or alternatively, adding a second sub-module to the first control module, and setting the object determination information associated with the first object and the associated application program unit capable of processing the first object as the object determination information and the associated application program corresponding to the second sub-module, respectively.

According to an example, the method may further comprise: acquiring a first associated service for processing the second object based on the first operation, wherein the first associated service is a service provided by a system installed in the electronic apparatus; setting the first associated service as an associated service corresponding to the first operating area based on the first operation; and selecting and setting a first associated application program unit, which is capable of processing the second object based on the first associated service, for the first operating area. Further, the method may further comprise: acquiring a second operation on at least one of the second objects in the first operating area; and processing the at least one of the second objects based on the first associated service according to the second operation.

According to a further embodiment of the present disclosure, there is provided an object processing method for an electronic apparatus, the electronic apparatus comprising a display screen having a user operation interface displayed thereon, wherein the user operation interface includes at least two operating areas having their respective sizes associated with each other, the object processing method comprising: determining that an application program unit corresponding to a first one of the at least two operating areas is a Launcher application program; determining a first object corresponding to the first operating area, wherein the first object is a startup program for an application program installed in the electronic apparatus; and displaying the first object in the first operating area, wherein the Launcher application program, after being run, is operable to perform an edit operation on the first object.

According to an example, the first object may comprise a startup program for a first application program in the electronic apparatus which satisfies a predetermined condition. The user operation interface may have a control module provided thereon. The Launcher program may exclusively occupy the display screen when the control module is drawn to a first region of the display screen, wherein a distance from any point in the first region to a vertex of the display screen is smaller than a predetermined value.

According to embodiments of the present disclosure, the display screen may have its display region divided into several operating areas, each of which may have corresponding object(s) displayed thereon. A user may enlarge one of the operating areas to a certain extent by means of, for example, drawing or dragging, which will automatically trigger opening of an application program (APP) unit capable of performing a corresponding process operation on the object(s) in this operating area. In this way, it is possible to achieve novel object management which is convenient for the user. Further, object determination information can be acquired based on an operation by the user on an operating area, a corresponding object can be determined based on the object determination information, and an object in this operating area can be replaced with the determined object. In this way, it is possible to achieve rapid replacement of the objects.

According to embodiments of the present disclosure, with the control module, it is convenient for the user to adjust the sizes of the operating areas. Further, sub-modules may be provided in the control module. Thus, in replacing the object, the object determination information for the replaced object is set as corresponding to the sub-module. Thus, this object can be re-displayed onto the operating area by a further replacement in a simply way. As a result, it is possible to achieve rapid switching between the objects.

According to embodiments of the present disclosure, the objects in the operating areas can be processed by the services provided by the system. As a result, the user can know contents carried by the objects in advance, without opening any APPs.

According to embodiments of the present disclosure, after the APP is controlled to be in the ready state, the APP unit can perform the corresponding process operation on the object from a predetermined position of the object based on the corresponding service. Here, the predetermined position is a position by which the object has been processed by the corresponding functional module before the APP unit is controlled to be in the ready state. As a result, it is possible to achieve seamless process of the object.

DETAILED DESCRIPTION

Hereinafter, reference will be made to embodiments of the present disclosure in more detail, examples of which are show in accompanying drawings. It is to be understood that those descriptions are only illustrative, and are not intended to limit the present disclosure.

According to embodiments of the present disclosure, a display screen may have its display region divided into several areas, each of which may have a corresponding object displayed thereon. A user may enlarge one of the operating areas to a certain extent by means of, for example, drawing or dragging, which will automatically trigger opening of an application program (APP) unit capable of performing a corresponding process operation on the object in this operating area. In this way, it is possible to achieve novel object management which is convenient for the user.

According to an embodiment of the present disclosure, there is provided an electronic apparatus. The electronic apparatus may comprises: a display screen; an interface management module configured to generate a user operation interface on the display screen, the user operation interface including a first operating area and a second operating area, wherein the first operating area and the second operating area have their respective sizes associated with each other in the user operation interface; a first functional module configured to display a first object in the first operating area; a second functional module configured to display a second object in the second operating area; a first APP unit configured to perform a corresponding process operation on the first object; an acquisition unit configured to acquire a first operation by a user on the first operating area; and a control unit configured to control the first APP unit to be in a ready state when the first operation satisfies a predetermined condition.

Figure 1:
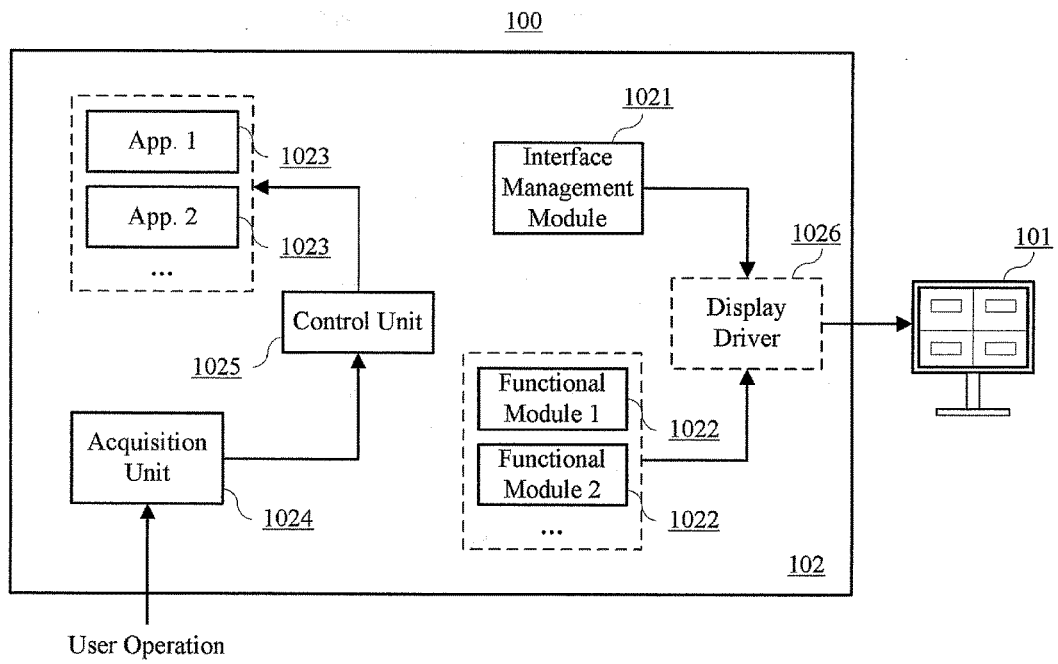
FIG. 1 is a block diagram showing a configuration of an electronic apparatus according to an embodiment of the present disclosure.

FIG. 1 is a block diagram showing a configuration of an electronic apparatus according to an embodiment of the present disclosure. As shown in FIG. 1, the electronic apparatus 100 according to this embodiment comprises a display screen 101 and a host device 102. The display screen 101 is configured to display information outputted from the host device 102.

Further, as shown in FIG. 1, the host device 102 may comprise an interface management module 1021, one or more functional modules 1022, an APP unit pool including one or more APP units 1023, an acquisition unit 1024, and a control unit 1025.

Figure 3:
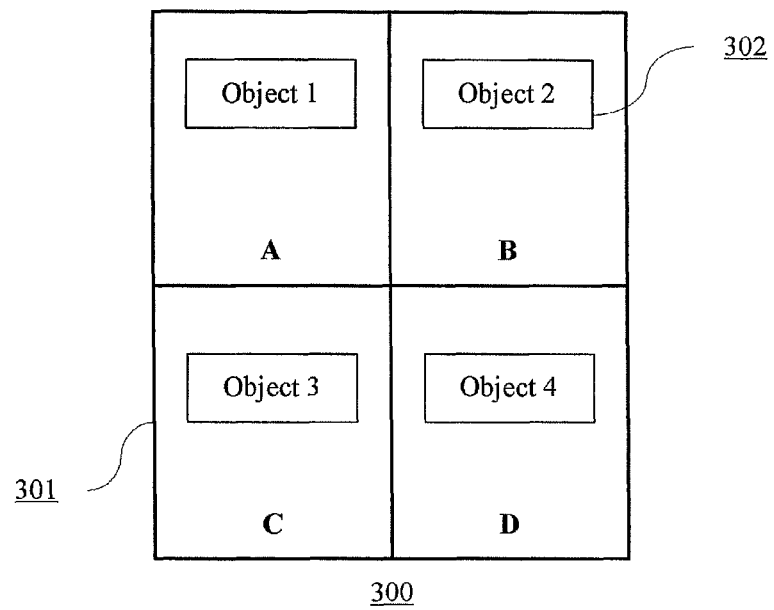
FIG. 3 is a schematic view showing a user operation interface.

The interface management module 1021 is configured to generate a user operation interface on the display screen 101 (through, for example, a display driver 1026). The user operation interface may include a plurality of operating areas. FIG. 3 is a schematic view showing an example of the user operation interface. As shown in FIG. 3, the user operation interface 300 may include a number, e.g., 4, of operating areas 301, and each of the operating areas 301 may have at least one object 302 displayed thereon. Specifically, the 4 operating areas 301 are an operating area A displaying an icon of Object 1, an operating area B displaying an icon of Object 2, an operating area C displaying an icon of Object 3, and an operating area D displaying an icon of Object 4, respectively. According to an example, the operating areas A, B, C, and D do not overlap with each other. Because these operating areas do not overlap with each other while the display screen has a certain size, the operating areas may have their respective sizes associated with each other.

Please be noted that the division of the operating areas as described above is just an example, and other divisions such that various operating areas have different sizes are also feasible, detailed descriptions of which are omitted here.

The functional modules 1022 are configured to display the respective objects in the respective operating areas (through, for example, the display driver 1026). For example, each of the operating areas may have a functional module corresponding thereto, and these functional modules are configured to display the respective objects on the corresponding operating areas. Certainly, at least some of these functional modules can be implemented integrally in a single module, or can be implemented separately in separate modules. In the present disclosure, a case where the respective functional modules are formed separately is exemplified, just for convenience of understanding. However, this does not imply that the respective functional modules must be provided individually. One example of such functional module is a resource manager, or the like.

The functional modules 1022 may be configured to display the objects directly in the operating areas, or to display the objects otherwise, for example, by means of icons, as long as that they are discernable to the user. The present disclosure is not limited to the specific displaying forms of the objects.

The APP pool may comprise APP units 1023 which are capable of performing corresponding processes on the respective objects. Specifically, for each of the objects displayed in the operating areas, there may be an APP unit, which is capable of performing a corresponding process operation (for example, an operation to open the object) on this object, installed in an Operating System (OS). For example, for an object of a Word file, a corresponding APP unit can be Microsoft Office Word, and a corresponding process operation can be an operation to open the Word file; for an object of a MP3 file, a corresponding APP unit can be Windows Media Player, and a corresponding process operation can be an operation to play the MP3 file; for an object of a HTML file, a corresponding APP unit can be Internet Explorer, and a corresponding process operation can be an operation to open the HTML file; and the like, just to name a few of examples.

The acquisition unit 1024 is configured to acquire an operation by a user on any of the operating areas. Specifically, the user may operate on the operating area by means of, for example, drawing or dragging, to enlarge or shrink the operating area. The acquisition unit 1024 transmits the acquired user operation to the control unit 1025, so that the control unit 1025 can perform process corresponding to the user operation.

The control unit 25 is configured to control overall operations of the electronic apparatus 100. FIG. 1 only shows connections between the control unit and the APP unit pool and the acquisition unit 1024. However, it is to be understood that there may be connections between the control unit 1025 and other components such as the interface management unit 1021 and the functional modules 1022.

According to an example, when the user performs a first operation on one of the operating areas (hereinafter, "a first operating area"), if the first operation satisfies a predetermined condition, implying that the user desires to open a first APP unit which is capable of performing a corresponding process operation on a first object in the first operating area, then the control unit 1025 may control the first APP unit to be in a ready state. The predetermined condition may comprise that the first operating area is enlarged to a certain extent.

According to an embodiment of the present disclosure, the control unit 1025 may control the first APP unit only to be in the ready state, that is, the control unit 1025 may only open the first APP unit. According to a further embodiment of the present disclosure, the first APP unit may perform the corresponding process operation on the first object after it is controlled to be in the ready state.

For example, a corresponding APP can be opened immediate after a predetermined operation by the user is detected, and the object(s) in the operated area can be opened by the APP. For example, IE may be opened and then an HTML file may be opened by IE; or Windows Media Player may be opened and then a MP3 object may be played by Windows Media Player, and the like.

Figure 4:
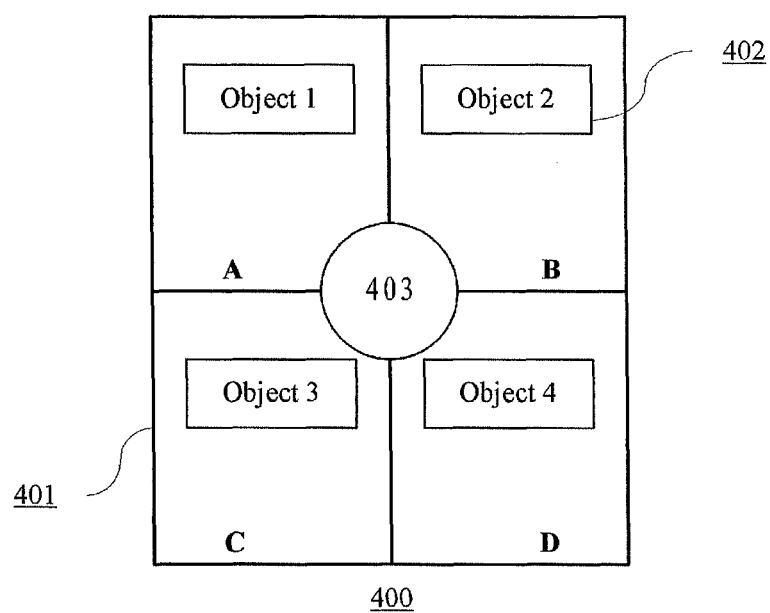
FIG. 4 is a schematic view showing a user operation interface including a control module.

As described above, the user may operate on the operating area to trigger the corresponding APP unit to be in the ready state. According to an embodiment of the present disclosure, the interface management module 1021 may be further configured to provide a control module on the user operation interface. The control module can be positioned at an intersection of the operating areas, for example. As shown in FIG. 4, an operation interface 400 may comprise a number, e.g., 4, of operating areas 401, and each of the operating areas 401 may have at least one object 402 displayed therein. Specifically, the 4 operating areas 401 are an operating area A displaying an icon of Object 1, an operating area B displaying an icon of Object 2, an operating area C displaying an icon of Object 3, and an operating area D displaying an icon of Object 4, respectively. In the example operation interface 400 as shown in FIG. 4, a control module 403 is positioned at an intersection of the operating areas A, B, C, and D. The user may input an operation by means of this control module 403.

For example, the user may achieve the above described first operation by drawing or dragging the control module. If the control module is drawn to a first region which is distant from a vertex of the display screen by a distance less than a predetermined distance, then it can be determined that the inputted operation satisfies the predetermined condition.

Figure 5A:
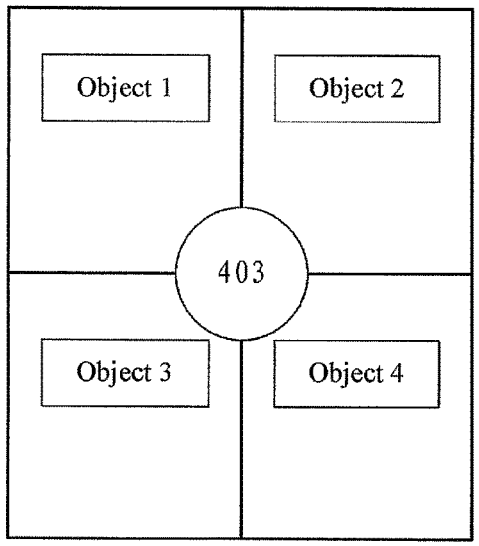
FIGS. 5*a*-5*c* are schematic views showing changing of operating areas in size during drawing.
Figure 5B:
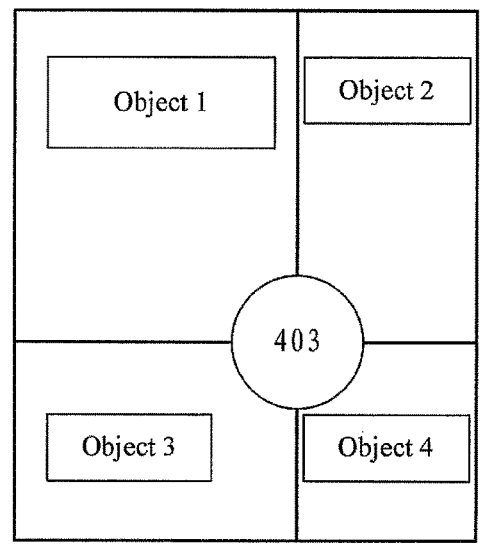
Figure 5C:
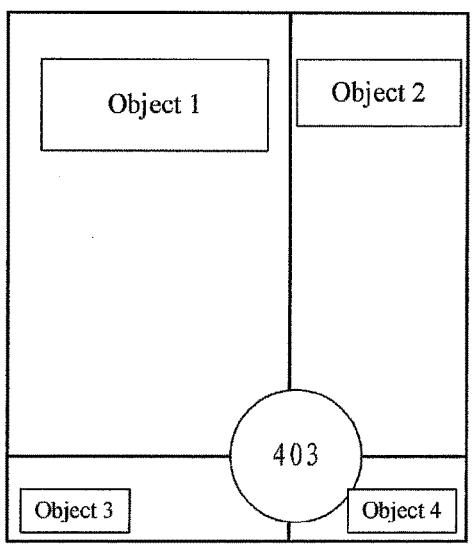

As described above, these operating areas have their respective sizes associated with each other. As a result, the interface management module 1021 may be further configured to control the sizes of the operating areas based on a current position of the control module during the drawing of the control module to the first region. FIGS. 5a-5c are schematic views showing changing of the sizes of the operating areas during the drawing of the control module 403.

Such a first region can be considered as an "absorption point" provided on the display screen. If the control module is drawn to the proximity to the absorption point, it will be determined that the inputted operation satisfies the predetermined condition, and thereby the corresponding APP unit is controlled to be in the ready state. When the operation satisfies the predetermined condition, an interface for the APP unit will be displayed instead of the previous user interface.

It is to be understood that the interface management module 1021 may be further configured to adjust the objects displayed in the operation areas in terms of number and/or display size based on changing of the sizes of the operating areas. FIGS. 5a-5c schematically show that the display sizes of the objects displayed in the operating areas are adjusted based on changing of the sizes of the operating areas. It is conceivable that the number of the displayed objects can be adjusted.

Figure 2:
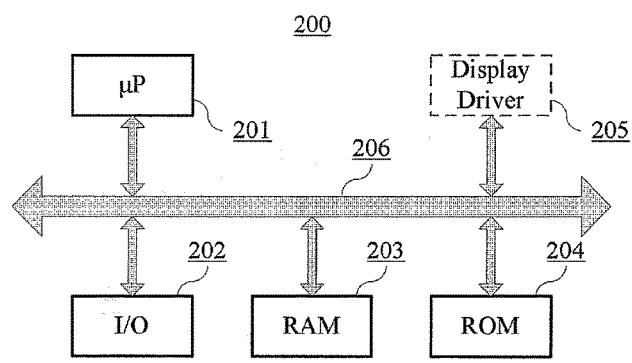
FIG. 2 schematically shows an implementation of a host device according to an embodiment of the present disclosure.

FIG. 2 shows an implementation of the host device according to an embodiment of the present disclosure. As shown in FIG. 2, the host device may be implemented as a computer device 200. The computer device 200 may comprise, for example, a microprocessor 201, an Input/Output (I/O) device 202, a Random Access Memory (RAM) 203 and a Read-Only Memory (ROM) 204, which are coupled via a bus 206.

The microprocessor 201 may comprise a Central Processing Unit (CPU), and may be configured to execute instructions, codes, programs or scripts, which can be accessed in the RAM 203, the ROM 204 or other memories (e.g., hard disk, floppy disk, optical disk, or the like, not shown) or otherwise obtained, for example, through network.

The I/O device 202 may comprise input/output devices such as display, keyboard, and mouse. Further, in FIG. 2, a display driver 205, which is also an I/O device, is particularly shown. However, because embodiments of the present disclosure particularly relate to the user operation interface displayed on the display screen, the display driver 205 is shown particularly.

The RAM 203 may be configured to store volatile data, and may store instructions to be executed by the processor 201. The ROM 204 is a non-volatile memory device, and typically has a relatively small memory capacity. The ROM 204 may be configured to store instructions, and may store data to be read during execution of the instructions.

According to an example, the acquisition unit 1024 as described above with reference to FIG. 1 may be embodied by the I/O device 202. Further, the microprocessor 201 may be used to embody the control unit 1025 as described above with reference to FIG. 1, and may be used to embody the interface management module 1021, the functional modules 1022, and the APP units 1023 as described above with reference to FIG. 1 by running instructions stored in the RAM 203, the ROM 204 or the other memories.

According to an embodiment of the present disclosure, the first APP unit can be controlled to be in the ready state when the first operation satisfies the predetermined condition, as described above. The first APP unit can be one that is determined based on pre-stored correspondences between the operating areas and the APPs. Specifically, the first APP unit is one corresponding to the first operating area.

Alternatively, when the inputted operation satisfies the predetermined condition, the first object displayed in the operated area can be determined, and then the first APP unit can be selected from APPs capable of performing the corresponding process operation on the first object.

More detailed descriptions are given in the following with respect to the latter case by way of example.

As described above, an "absorption point" may be provided on the display screen. When the control module is drawn to the proximity to the absorption point, it is determined that the inputted operation satisfies the predetermined condition. At this time, the object(s) in the first operating area can be determined, and the APP can be determined based on the object(s). For example, if the object is an Word file object, then the corresponding APP unit may be Microsoft Office Word, tablet, or some other APP capable of opening the Word file object; if the object is a MP3 file object, then the corresponding APP unit may be Windows Media Player, Realplayer, Storm player, or some other APP capable of opening the MP3 file object.

In general, in the OS, there may be various services, such as service for playing audio files, service for playing video files, service for opening text documents, and the like. Based on these services, the OS can perform basic processes on the objects (for, e.g., sound output, video preview, and the like). According to an embodiment of the present disclosure, the electronic apparatus may further comprise a system unit (not shown) configured to provide a first service and a second service. The first functional module may be further configured to perform a first processing on the first object in the first operating area based on the first service, and the second functional module may be further configured to perform a second processing on the second object in the second operating area based on the second service.

In this case, the user can have an object processed by the services provided by the system by, for example, simply clicking the object, without opening any APP. As a result, the user can know contents (such as sound and video) carried by the object in advance.

According to an example, the first APP unit can be one capable of performing the corresponding process operation on the first object based on the first service.

As stated above, the functional modules can be further configured to process the objects in the operating areas based on the services provided by the system. Further, if an inputted operation satisfying the predetermined condition is detected, a corresponding APP unit will be controlled to be in the ready state. In this case, for seamless process of the objects, the APP unit can perform the corresponding process operation on the first object from a first position of the first object based on the first service after it is controlled to be in the ready state. Here, the first position is a position by which the first object has been processed by the first functional module before the first APP unit is controlled to be in the ready state.

More detailed descriptions will be given in the following with respect to playing of a sound file by way of example.

For example, the functional module is processing an audio file object in the operating area based on the service provided by the system and thus has played the audio file object to the 10th second, while the user draws the control module to the proximity to the absorption point. At this time, Windows Media Player is opened to open and thus play the audio file object. As stated above, Windows Media Player decodes and thus plays the audio file object from the 10th second, instead of the very beginning thereof. In this way, it is possible to achieve the seamless process for the object.

Figure 6:
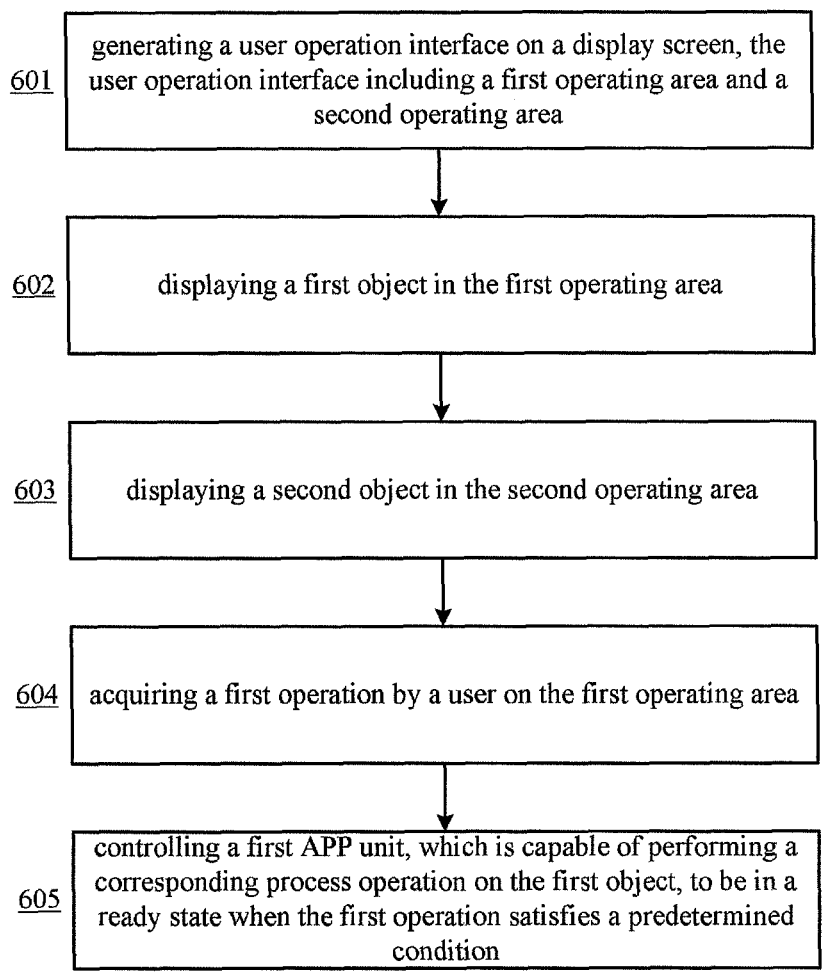
FIG. 6 is a flowchart schematically showing an object processing method according to an embodiment of the present disclosure.

According to a further embodiment of the present disclosure, there is provided an object processing method in an electronic apparatus, the electronic apparatus comprising a display screen. As shown in FIG. 6, the object processing method may comprises:

Block 601: generating a user operation interface on the display screen, the user operation interface including a first operating area and a second operating area, wherein the first operating area and the second operating area have their respective sizes associated with each other in the user operation interface;

Block 602: displaying a first object in the first operating area;

Block 603: displaying a second object in the second operating area;

Block 604: acquiring a first operation by a user on the first operating area; and Block 605: controlling a first APP unit, which is capable of performing a corresponding process operation on the first object, to be in a ready state when the first operation satisfies a predetermined condition.

It is to be noted that the above descriptions do not imply that the above operations must be performed in the shown order. For example, displaying of the first object and displaying of the second object may be performed at the same time or in sequence. In the latter case, the order of displaying them is not particularly limited.

The first APP unit may, after being controlled to be in the ready state, perform the corresponding process operation on the first object.

According to an embodiment, for convenience of the user, a control module may be provided on the user operation interface. For example, the control module can be positioned at an intersection of the first and second operating areas. In this case, the above described first operation may comprise drawing or dragging of the control module. For example, if the control module is drawn to a first region which is distant from a vertex of the display screen by a distance less than a predetermined distance, then it can be determined that the inputted operation satisfies the predetermined condition.

The sizes of the first and second operating areas may be controlled based on a current position of the control module during the drawing of the control module to the first region.

Further, the objects displayed in the first and second operating areas may be adjusted in terms of number and/or display size based on changing of the sizes of the first and second operating areas.

According to a further embodiment, for convenience of the user in knowing contents carried by the objects in advance, the method may further comprise: performing a first processing on the first object in the first operating area based on a first service provided by a system unit; and performing a second processing on the second object in the second operating area based on a second service provided by the system unit. In this case, the first APP unit may be configured to perform the corresponding process operation on the first object based on the first service.

Further, for seamless process of the objects, according to an embodiment of the present disclosure, the first APP unit can perform the corresponding process operation on the first object from a first position of the first object based on the first service after it is controlled to be in the ready state.

Here, the first position is a position by which the first object has been processed before the first APP unit is controlled to be in the ready state.

According to a further embodiment of the present disclosure, object determination information can be acquired based on an operation by the user on an operating area, a corresponding object can be determined based on the object determination information, and an object in this operating area can be replaced with the determined object. In this way, it is possible to achieve rapid replacement of the objects.

According to an embodiment of the present disclosure, there is provided an electronic apparatus. The electronic apparatus may comprise: a display screen; an interface management module configured to generate a user operation interface on the display screen, wherein the user operation interface includes at least two operating areas having their respective sizes associated with each other, and wherein a first operating area of the at least two operating areas includes at least a first object therein; a first operation acquisition unit configured to acquire a first operation; an object-determination-information acquisition unit configured to acquire object determination information based on the first operation; an object determination unit configured to determine a second object based on the object determination information; an object alternation unit configured to alter the first object displayed in the first operating area to the second object based on the first operation.

Figure 7:
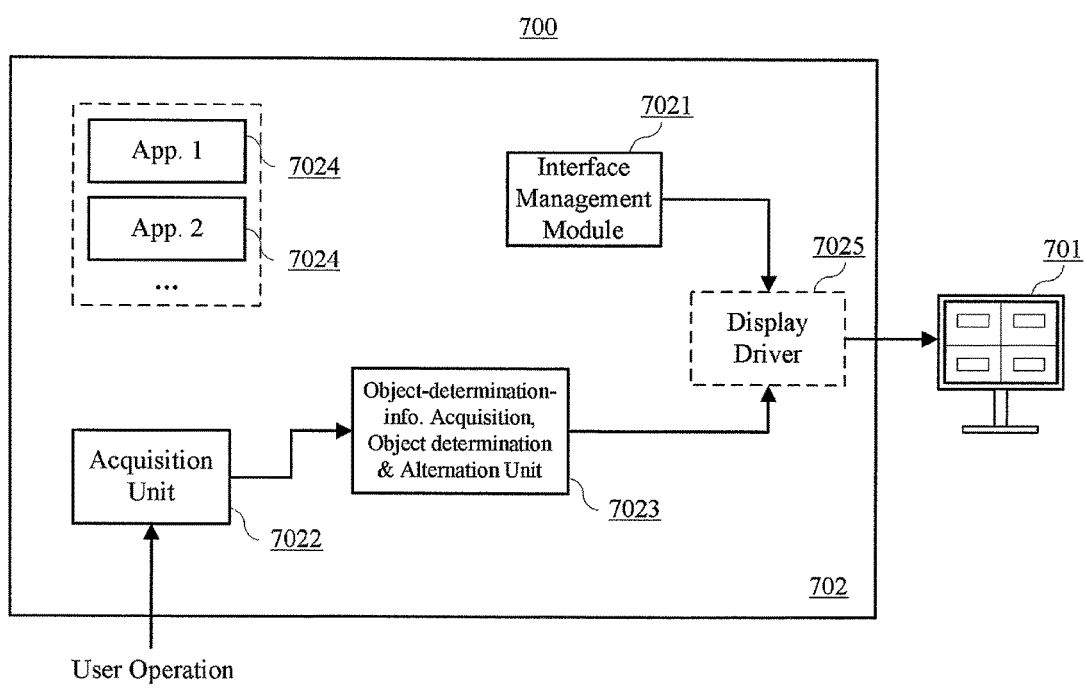
FIG. 7 is a block diagram showing a configuration of an electronic apparatus according to a further embodiment of the present disclosure.

FIG. 7 is a block diagram showing a configuration of an electronic apparatus according to an embodiment of the present disclosure. As shown in FIG. 7, the electronic apparatus 700 according to this embodiment comprises a display screen 701 and a host device 702. The display screen 701 is configured to display information outputted from the host device 702.

Further, as shown in FIG. 7, the host device 702 may comprise an interface management module 7021, a first operation acquisition unit 7022, and an object-determination-information acquisition unit, an object determination unit and an object alternation unit 7023 (which are shown as one block in FIG. 7). Further, the host device 702 may comprise an APP unit pool including one or more APP units 7024. Information outputted by the respective components of the host device can be displayed on the display screen 701 through, for example, a display driver 7025. For example, the host device 702 can be implemented as the computer device as shown in FIG. 2.

It is to be noted that in FIG. 7 the object-determination-information acquisition unit, the object determination unit and the object alternation unit are shown together just for brevity. However, it does not imply that they must be integrated into one same component. Instead, they can be implemented in different components, or some of them can be implemented in one same component.

The interface management module 7021 is configured to generate a user operation interface on the display screen 701. As to the user operation interface, reference may be made to FIG. 3. The user operation interface may comprise at least two operating areas, each of which may have at least one object displayed therein.

The first operation acquisition unit 7022 is configured to acquire an operation by the user on any of the operating areas. For example, the user's operation may comprise drawing or dragging by means of, for example, a mouse, to enlarge or shrink the operating area, or to rotate a control module (as will be described in detail in the following).

The object-determination-information acquisition unit (7023) is configured to acquire object determination information based on the user's operation. According to embodiments of the present disclosure, the object determination information can be information in various forms. For example, the object determination information may comprise storage location information, such as information indicating "E:\Affairs to be handled\Client A"; the object determination information may comprise object attribute information, such as information indicating an object attribute of video; or the object determination information may comprise APP unit information, such as information indicating an APP of Windows Media Player; and the like.

The object determination unit (7023) is configured to determine a corresponding object based on the object determination information. For example, if the object determination information comprises the storage location information, then the object can be determined directly based on the storage location information. For example, in a case where the information indicates "E:\Affairs to be handled\Client A" as described above, the object is determined as including all objects contained in the file folder "Client A" under the file folder "Affairs to be handled" in the directory E. Alternatively, if the object determination information comprises the object attribute information, then the object can be determined as being an object having an attribute the same as that indicated by the object attribute information. For example, in a case where the information indicates the object attribute of video as described above, the object is determined as including all files whose file type is video stored in the electronic apparatus. Or alternatively, if the object determination information comprises the APP unit information, then the object can be determined as being an object which is capable of being processed by an APP unit indicated by the APP unit information. For example, in a case where the information indicates Windows Media Player as described above, the object is determined as including all objects capable of being opened by Windows Media Player stored in the electronic apparatus.

The object alternation unit (7023) is configured to alter the object(s) displayed in the operated area to the determined object(s) according to the user's operation. For example, assume that the user operates a first operating area A. In this case, if the object is determined as including all the objects contained in the file folder "Client A" under the file folder "Affairs to be handled" in the directory E, then the electronic apparatus can access all the objects contained in the file folder "Client A" under the file folder "Affairs to be handled" in the directory E and display them onto the operating area A. In this way, it is possible to achieve rapid calling of the objects. Alternatively, if the object is determined as including all the files whose file type is video stored in the electronic apparatus, then the electronic apparatus can access all the video files stored therein and display them onto the operating area A for selection by the user. Or alternatively, if the object is determined as including all the objects capable of being opened by Windows Media Player stored in the electronic apparatus, then the electronic apparatus can access all the objects capable of being opened by Windows Media Player stored therein and display them onto the operating area A for selection by the user.

It is to be noted that the 3 types of object determination information and corresponding processes as described above are only illustrative. The 3 types of object determination information can be used alone or in combination. For example, an object located at a specific location and capable of being opened by a specific program can be designated by a specific piece of storage location information and a specific piece of APP unit information.

Figure 8:
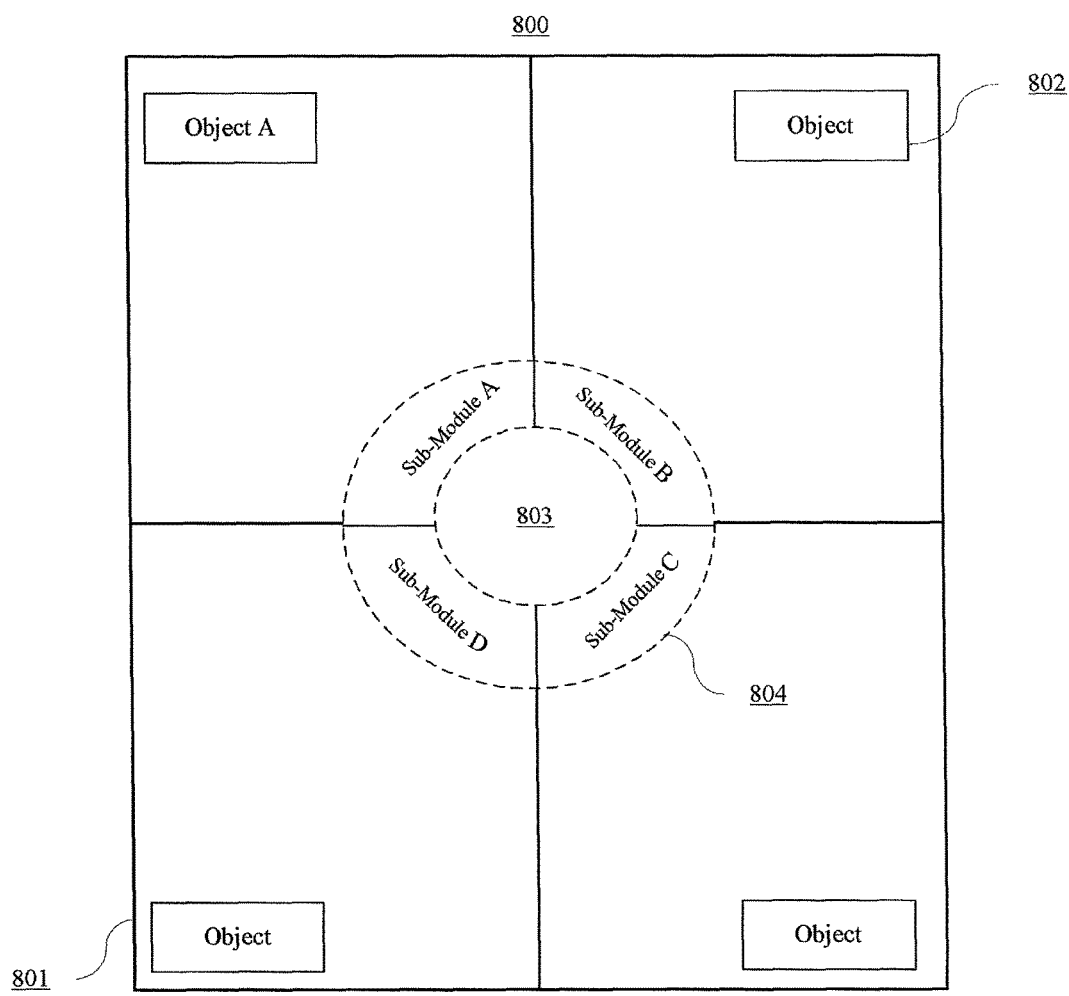
FIG. 8 is a schematic view showing a user operation interface including a first control module.

According to a further embodiment, the interface management module 7021 may be configured to further provide a first control module on the user operation interface. As shown in FIG. 8, a user operation interface 800 includes a number, e.g., 4, of operating areas 801, each of which has at least one object 802 displayed therein. A first control module 803 may be provided at an intersection of these 4 operating areas 801. The first control module 803 may include a plurality of sub-modules 804. Each of the sub-modules 804 may correspond to a piece of object determination information, and may have an indicator indicating the corresponding objet determination information (not shown) displayed thereon. Here, assume that sub-modules A, B, C and D have corresponding pieces of object determination information X1, X2, X3 and X4, respectively.

In this case, the object-determination-information acquisition unit may be configured to determine a first one of the sub-modules based on the inputted operation and acquire the object determination information corresponding to the first sub-module.

More detailed descriptions will be given with respect to a user's operation of clicking the sub-module A and then sliding it to a first operating area (where an object A is being displayed), by way of example. In this case, based on the operation of clicking the sub-module A, the object-determination-information acquisition unit (7023) may determine the sub-module A and acquire the object determination information X1 corresponding to the sub-module A. Then, the object determination unit (7023) may determine a corresponding object based on the object determination information X1. The object alternation unit (7023) may alter the object A displayed in the first operating area to the object determined by the object determination unit, based on the operation of sliding to the first operating area.

According to this embodiment, it is possible to achieve easy alternation.

In some cases, the user may desire to re-display the first object which has been replaced (the object A in the above example). According to a further embodiment of the present disclosure, the interface management module 7021 may be further configured to modify the indicator displayed on the first sub-module and set the object determination information associated with the first object as the object determination information corresponding to the first sub-module. Or alternatively, the interface management module 7021 may be further configured to add a second sub-module to the first control module and set the object determination information associated with the first object as the object determination information corresponding to the second sub-module.

Detailed descriptions will be given, still referring to the example shown in FIG. 8.

Figure 9:
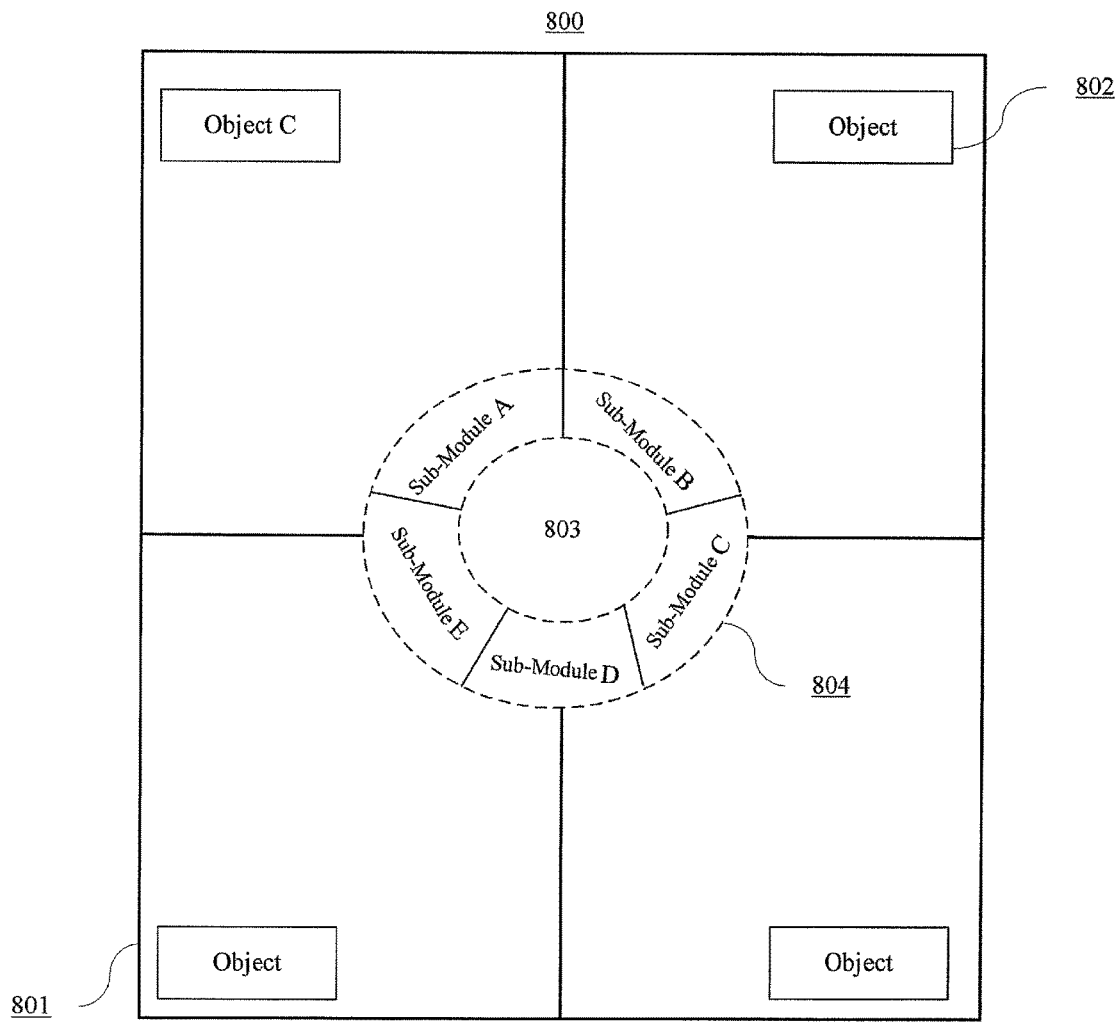
FIG. 9 is a schematic view showing an user operation interface including a first control module with a sub-module added.

When the alternation is finished, the first operating area is now displaying an object C instead of the object A, as shown in FIG. 9. In this case, the interface management module 7021 may add a second sub-module (E) to the first control module, and set the object determination information associated with the first object (the object A) as the object determination information corresponding to the sub-module E.

In this case, if the user desires to re-display the object A in the first operating area, then he/she can click the sub-module E and sliding it to the first operating area. Then, the object-determination-information acquisition unit (7023) may determine the sub-module E based on the operation of clicking the sub-module E, and thus acquire the object determination information corresponding to the sub-module E (i.e., the object determination information associated with the first object A). Thus, the object determination unit (7023) may determine the corresponding object A based on the object determination information. As a result, the object alternation unit (7023) alters the object C being displayed in the first operating area to the object A determined by the object determination unit, based on the operation of sliding to the first operating area.

Alternatively, the interface management module 7021 can modify the indicator displayed on the sub-module A, instead of adding the sub-module E as described above, and set the object determination information associated with the object A as the object determination information corresponding to the sub-module A.

In this case, if the user desires to re-display the object A in the first operating area, then he/she can click the sub-module A and sliding it to the first operating area. After the object A is re-displayed in the first operating area, the object determination information corresponding to the sub-module A can be set again as being the object determination information associated with the object C.

The above process can be repeated. As a result, the user can switch the object displayed in the first operating area between the objects A and C by clicking the sub-module A and sliding it to the first operating area. Thus, it is possible to achieve rapid switching between the objects.

Further, as described above, for each of the objects displayed in the operating areas, there may be a corresponding APP unit, which is capable of performing a corresponding process operation (e.g., an operation of opening the object) on the object, installed in the OS (reference may be made to the above descriptions in conjunction with FIG. 1, especially, 1023 shown therein).

According to an embodiment of the present disclosure, the electronic apparatus may further comprise: an APP acquisition unit (not shown) configured to acquire a first associated APP unit based on the first operation, wherein the first associated APP unit is capable of processing the second object based on a first associated service provided by the system; and a first associated APP setting unit (not shown) configured to set the first associated APP unit as an associated APP unit corresponding to the first operating area.

Still referring to the example shown in FIGS. 8 and 9, according to the operation of clicking the sub-module A and sliding it to the first operating area, the APP acquisition unit may acquire an APP unit capable of processing the second object (the object C). The first associated APP setting unit may set the APP unit capable of processing the object C as the associated APP unit corresponding to the first operating area.

According to an embodiment, the interface management module 7021 may be further configured to display an indicator on each of the sub-modules of the first control module, and each of the sub-modules may have a piece of object determination information and an associated APP corresponding thereto. In this case, the object-determination-information acquisition unit may be configured to determine a first one of the sub-modules based on the inputted operation and acquire the object determination information corresponding to the first sub-module. The APP acquisition unit may be configured to determine a first one of the sub-modules based on the inputted operation and acquire the associated APP corresponding to the first sub-module.

Similarly, the interface management module 7021 may be further configured to modify the indicator displayed on the first sub-module, and to set object determination information associated with the first object and an associated APP unit capable of processing the first object as the object determination information and the associated APP corresponding to the first sub-module, respectively. Or alternatively, the interface management module 7021 may be further configured to add a second sub-module to the first control module, and to set the object determination information associated with the first object and the associated APP unit capable of processing the first object as the object determination information and the associated APP corresponding to the second sub-module, respectively.

Detailed descriptions will be given, still referring to the example shown in FIGS. 8 and 9.

When the alternation is finished, the first operating area is now displaying the object C (see FIG. 9) instead of the object A (see FIG. 8). In this case, the interface management module 7021 may add a second sub-module (for example, the sub-module E as shown in FIG. 9) to the first control module, and set the object determination information associated with the first object (the object A) as the object determination information corresponding to the sub-module E and set the associated APP unit capable of processing the first object (the object A) as the associated APP unit corresponding to the sub-module E.

Alternatively, the interface management module 7021 can modify the indicator displayed on the sub-module A, instead of adding the sub-module E as described above, and set the object determination information associated with the first object (the object A) as the object determination information corresponding to the sub-module A and set the associated APP unit capable of processing the first object (the object A) as the associated APP unit corresponding to the sub-module A.

Thus, not only the object determination information but also the associated APP unit are altered together with the alternation of the object. Uses of the associated APP units will be described in detail in the following.

Further, as stated above, in the OS, generally there may be various services, such as service for playing audio files, service for playing video files, service for opening text documents, and the like. According to an embodiment of the present disclosure, the electronic apparatus may further comprise: an associated service acquisition unit (not shown) configured to acquire a first associated service for processing the second object based on the first operation, wherein the first associated service is a service provided by a system installed in the electronic apparatus; and an associated service setting unit (not shown) configured to set the first associated service as an associated service corresponding to the first operating area.

Still referring to the example shown in FIGS. 8 and 9, according to the operation of clicking the sub-module A and sliding it to the first operating area, the associated service acquisition unit may acquire an associated service for processing the second object (the object C). The associated service setting unit may set the acquired associated service for processing the object C as an associated service corresponding to the first operating area.

In this case, the electronic apparatus may further comprise: a second associated APP setting unit (not shown) configured to select and set a first associated APP unit, which is capable of processing the second object based on the first associated service, for the first operating area.

In a case where the associated services are provided as stated above, the electronic apparatus may further comprise: a second operation acquisition unit (not shown) configured to acquire a second operation (e.g., clicking) on at least one of the second objects in the first operating area; and an object processing unit (not shown) configured to process (e.g., preview) the at least one of the second objects based on the first associated service according to the second operation. Here, the second operation acquisition unit and the first operation acquisition unit may be implemented as one same component or as different components.

In this case, the user can know contents (such as sound and video) carried by the object in advance, by, for example, simply clicking the object, without opening any APP, because the services provided by the system can process the object.

As described above, each of the operating areas may have an associated APP corresponding thereto. In this case, some of the features described above in conjunction with FIG. 1 may be incorporated here. For example, the electronic apparatus may further comprise: a third operation acquisition unit (not shown; reference may be made to the above descriptions in conjunction with FIG. 1, especially, the acquisition unit 1024 shown therein) configured to acquire a third operation by the user on the first operating area; and an APP control unit (not shown; reference may be made to the above descriptions in conjunction with FIG. 1, especially, the control unit 1025 shown therein) configured to control a first APP unit to be in a ready state if the third operation satisfies a predetermined condition. The first APP unit may process the second object based on the first associated service. Here, the third operation may comprise an operation of drawing or dragging the operating area to enlarge or shrink the operating area, for example. The predetermined condition may be that the first operating area is enlarged to a certain extent. The above descriptions regarding those two units also apply here.

As described above, the user may operate an operating area to trigger a corresponding APP unit to be in the ready state. According to an embodiment of the present disclosure, the interface management module 7021 may be further configured to provide a second control module at an intersection of the operating areas on the user operation interface (reference may be made to the above descriptions in conjunction with FIG. 4, especially, the control module 403 shown therein). The above descriptions regarding this control module also apply here.

According to an embodiment, the first and second control modules may be integrated with each other.

Figure 10:
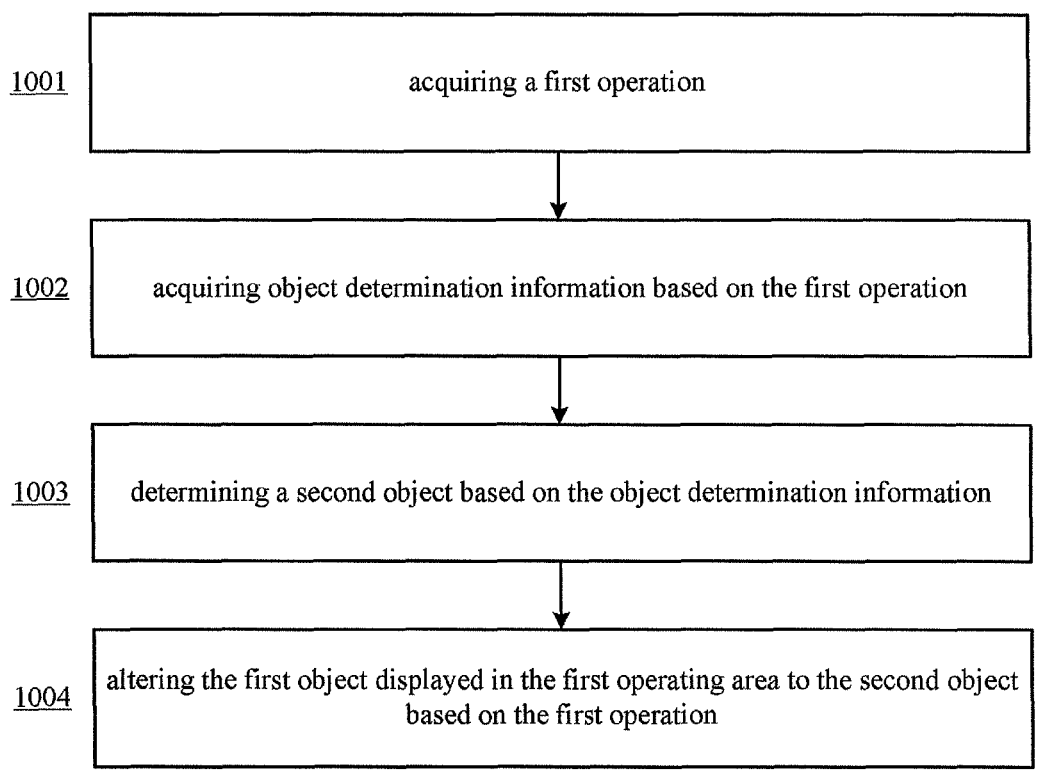
FIG. 10 is a flowchart schematically showing an object processing method according to a further embodiment of the present disclosure.

According to a further embodiment of the present disclosure, there is provided an object processing method for an electronic apparatus. The electronic apparatus may comprises a display screen having a user operation interface displayed thereon, wherein the user operation interface includes at least two operating areas having their respective sizes associated with each other and a first operating area of the at least two operating areas includes at least a first object therein. As shown in FIG. 10, the object processing method may comprises:

Block 1001: acquiring a first operation;

Block 1002: acquiring object determination information based on the first operation;

Block 1003: determining a second object based on the object determination information; and Block 1004: altering the first object displayed in the first operating area to the second object based on the first operation.

The above descriptions in conjunction with FIG. 7 also apply here.

As described above, the display screen may have the user operation interface displayed thereon. The user operation interface may include at least two operating areas. According to an embodiment, one of the operating areas may be set to display startup programs for installed APPs. In this case, according to an embodiment, there is provided an object processing method for an electronic apparatus. The electronic apparatus may comprise a display screen having a user operation interface displayed thereon, wherein the user operation interface includes at least two operating areas having their respective sizes associated with each other. The object processing method may comprise: determining that an APP unit corresponding to a first one of the at least two operating areas is a Launcher APP; determining a first object corresponding to the first operating area, wherein the first object is a startup program for an APP installed in the electronic apparatus (that is, the installed APP can be opened by execution of the startup program to provide a corresponding service for the user, such as text editing service, video playing service, and network browsing service); and displaying the first object in the first operating area. Here, the Launcher APP, after being run, is operable to perform an edit operation on the first object.

The Launcher APP, after being executed, will present startup programs for all the APPs installed in the electronic apparatus, and can edit all these startup programs. Certainly, the operation of editing may comprise various operations such as addition, deletion, and modification.

When the installed APPs are great in number while the screen of the electronic apparatus is limited in size, the first objects can be limited to the startup programs for first APPs satisfying a predetermined condition in the electronic apparatus, to ensure the display effect. As a result, it is possible to give a better presentation effect to the user.

For example, the predetermined condition may comprise: an accumulative number of executions greater than a predetermined threshold, an interval from the latest execution to the current time no greater than a predetermined threshold, or a level of priority greater than a predetermined threshold.

The above conditions are only illustrative. The user may preset the predetermined condition as desired to control the objects displayed in the operating area.

There may be a control module provided on the user operation interface. The Launcher program may exclusively occupy the display screen when the control module is drawn to a first region of the display screen. Here, a distance from any point in the first region to a vertex of the display screen is smaller than a predetermined value.

During the drawing of the control module to the first region, the number of the startup programs displayed in the first operating area becomes more and more. When the control module is drawn to the first region of the display screen and then released, the Launcher program will be executed to display the startup programs on the display screen. At this time, the previous user operation interface disappears.

More detailed descriptions will be given with respect to a specific example.

Figure 11:
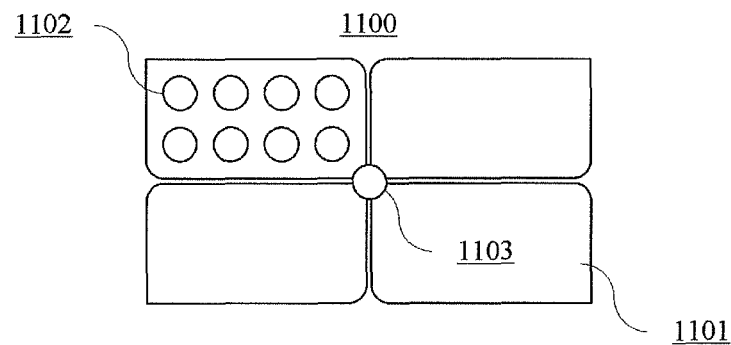
FIG. 11 is a schematic view showing a user operation interface according to an example.

According to an example, a user operation interface 1100 presented after power on is divided into four operating areas 1101, as shown in FIG. 11. Among the four operating areas, the operating area 1101 at the upper left corner displays icons 1102 for applications, so that the user can view these application icons in this operation interface (each of circles shown in the operating area at the upper left corner indicates a startup program for an installed APP), and can enter one of the applications by directly clicking it.

Figure 12:
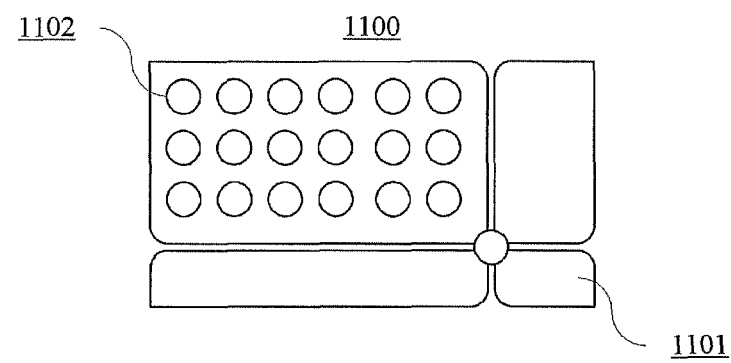
FIG. 12 is a schematic view showing changing of displayed icons in number when a user operation interface is being drawn.

In the operation interface 1100 shown in FIG. 11, the user may draw a control module 1103 to change the four operating areas 1101 in their respective sizes. The user can have an experience of control during drawing. Further, the sizes of the operating areas can be customized by drawing, resulting in an increased sense of motion and entertaining of the interface. The operating area with its size enlarged may display more application icons 1102, as shown in FIG. 12. Specifically, when the operating area 1101 at the upper left corner is enlarged by drawing, the number of the icons 1102 displayed therein is obviously greater than that shown in FIG. 10.

Figure 13:
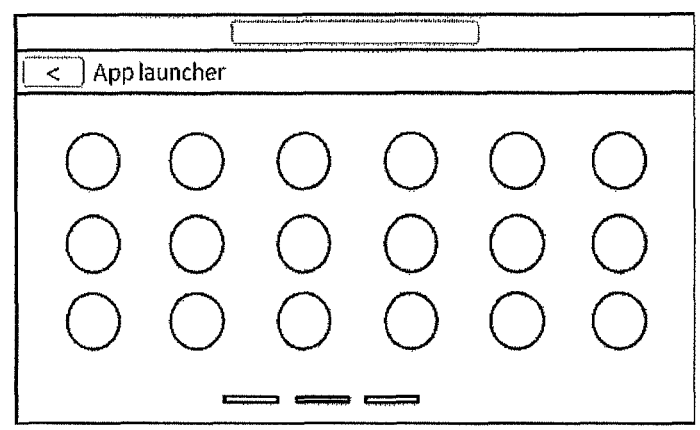
FIG. 13 is a schematic view showing an interface after Launcher is initiated.

When the user draws the control module to the lower right area of the screen, the electronic apparatus initiates the Launcher program, so that the user can view all the application icons (i.e., the startup programs for the installed APPs). FIG. 13 schematically shows an interface after the Launcher program has been initiated.

Then, the user can view all the application icons by sliding top and down and/or right and left.

Alternatively, the Launcher program can display the icons for some of the APPS satisfying the predetermined condition onto the display screen. In this case, the user can directly view the icons for the APPS satisfying the predetermined condition (i.e., the startup programs for the installed APPs), without need for sliding top and down and/or right and left to search a great number of the application icons for a specific one. As a result, the user can search for a desired icon rapidly. In this way, it is possible to achieve a rapid access to the applications, without switching between several screens.

The mere fact that the various embodiments are described separately does not necessarily mean that measures recited in these embodiments cannot be used in combination to advantage.

The above embodiments are provided for illustrative purpose. It is to be noted that various modifications and variations are apparent for those skilled in the art, without departing from the principle of the present disclosure, and all these modifications and variations should be considered as falling into the scope of the present disclosure.

We claim:

1. An electronic apparatus, comprising:
 a display screen; and
 a host device comprising:
  an interface management module configured to generate a user operation interface on the display screen, the user operation interface including a first operating area and a second operating area, wherein the first operating area and the second operating area have their respective sizes associated with each other in the user operation interface;
  wherein the interface management module is configured to provide a control module on the user operation interface,
  a first functional module configured to display an icon of a first object in the first operating area;
  a second functional module configured to display an icon of a second object in the second operating area;
  a first application program unit configured to perform a corresponding process operation on the first object;
  an acquisition unit configured to acquire a first operation by a user on the control module controlling the size of the first operating area; and
  a control unit configured to control the first application program unit to be in a ready state when the first operation satisfies a predetermined condition,
  wherein the first application program unit is configured to perform the corresponding process operation on the first object after the first application program unit is controlled to be in the ready state,
  wherein the control unit is configured to determine that the first operation satisfies the predetermined condition when the control module is drawn to a first region of the display screen to control the size of the first operating area, and when a distance from any point in the first region to a vertex of the display screen is smaller than a predetermined value, and
  in response to the determination, automatically trigger opening of a first application program and displaying a first interface corresponding to the first application program unit
  wherein the interface of the first application program unit exclusively occupies the display screen.

2. The electronic apparatus according to claim 1, wherein the interface management module is further configured to control the sizes of the first and second operating areas based on a current position of the control module during the drawing of the control module to the first region, and wherein the interface management module is further configured to adjust the objects displayed in the first and second operating areas in terms of number or display size based on changing of the sizes of the first and second operating areas.

3. The electronic apparatus according to claim 1, wherein the host device further comprising:
 a system unit configured to provide a first service and a second service, wherein the first functional module is further configured to perform a first processing on the first object in the first operating area based on the first service,
 wherein the second functional module is further configured to perform a second processing on the second object in the second operating area based on the second service, and wherein the first application program unit is configured to perform the corresponding process operation on the first object based on the first service.

4. The electronic apparatus according to claim 3, wherein the first application program unit is configured to perform the corresponding process operation on the first object from a first position of the first object based on the first service after it is controlled to be in the ready state, wherein the first position is a position by which the first object has been processed by the first functional module before the first application program unit is controlled to be in the ready state.

5. An object processing method in an electronic apparatus, the electronic apparatus comprising a display screen, the object processing method comprising:
 generating a user operation interface on the display screen, the user operation interface including a first operating area and a second operating area, wherein the first operating area and the second operating area have their respective sizes associated with each other in the user operation interface;
 displaying an icon of a first object in the first operating area; displaying an icon of a second object in the second operating area;
 providing a control module on the user operation interface;
 acquiring a first operation by a user on the control module controlling the size of on the first operating area;
 controlling a first application program unit, which is capable of performing a corresponding process operation on the first object, to be in a ready state when the first operation satisfies a predetermined condition;

performing the corresponding process operation on the first object by the first application program unit after the first application program unit is controlled to be in the ready state; and determining that the first operation satisfies the predetermined condition when the control module is drawn to a first region of the display screen to control the size of the first operating area, and when a distance from any point in the first region to a vertex of the display screen is smaller than a predetermined value, and in response to the determination, automatically trigger opening of a first application program and displaying a first interface corresponding to the first application program unit, wherein the interface of the first application program unit exclusively occupies the display screen.

6. The object processing method according to claim 5, further comprising:

controlling the sizes of the first and second operating areas based on a current position of the control module during the drawing of the control module o the first region; and adjusting the objects displayed in the first and second operating areas in terms of number and/or display size based on changing of the sizes of the first and second operating areas.

7. The object processing method according to claim 5, further comprising:

performing a first processing on the first object in the first operating area based on a first service provided by a system unit; and performing a second processing on the second object in the second operating area based on a second service provided by the system unit, wherein the first application program unit is configured to perform the corresponding process operation on the first object based on the first service.

8. The object processing method according to claim 7, further comprising:

performing the corresponding process operation on the first object from a first position of the first object based on the first service by the first application program unit after it is controlled to be in the ready state, wherein the first position is a position by which the first object has been processed before the first application program unit is controlled to be in the ready state.

\* \* \* \* \*